(12) United States Patent
Hofmann et al.

(10) Patent No.: US 12,280,732 B2
(45) Date of Patent: Apr. 22, 2025

(54) SAFETY SYSTEM FOR A MOTOR VEHICLE, METHOD FOR CONTROLLING A SAFETY SYSTEM, AND CONTROL UNIT

(71) Applicant: ZF AUTOMOTIVE GERMANY GMBH, Alfdorf (DE)

(72) Inventors: Achim Hofmann, Tüßling (DE); Christian Jung, Mühldorf am Inn (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/015,983

(22) PCT Filed: Jul. 13, 2021

(86) PCT No.: PCT/EP2021/069458
§ 371 (c)(1),
(2) Date: Jan. 13, 2023

(87) PCT Pub. No.: WO2022/013218
PCT Pub. Date: Jan. 20, 2022

(65) Prior Publication Data
US 2023/0271587 A1    Aug. 31, 2023

(30) Foreign Application Priority Data
Jul. 15, 2020  (DE) ............... 10 2020 118 712.2

(51) Int. Cl.
*B60R 21/268*        (2011.01)
(52) U.S. Cl.
CPC ................. *B60R 21/268* (2013.01)
(58) Field of Classification Search
CPC ....... B60R 21/16; B60R 21/26; B60R 21/268; B60R 21/272; B60R 2021/2685;
(Continued)

(56) References Cited

U.S. PATENT DOCUMENTS

| 6,425,602 B1 | 7/2002 | Al-Amin et al. |
| 2008/0172157 A1 | 7/2008 | Hall et al. |

(Continued)

FOREIGN PATENT DOCUMENTS

| DE | 4041049 A1 | 7/1992 |
| DE | 19526334 A1 | 1/1997 |

(Continued)

OTHER PUBLICATIONS

Description Translation for JP 2004/155288 from PE2E Search (Year: 2004).*

(Continued)

*Primary Examiner* — Jason D Shanske
*Assistant Examiner* — Daniel M. Keck
(74) *Attorney, Agent, or Firm* — Tarolli, Sundheim, Covell & Tummino LLP

(57) ABSTRACT

A safety system (18) for an automotive vehicle (10) comprises a gas tank (20) in which pressurized gas is stored, a valve (22) associated with the gas tank (20), at least one airbag (24) connected to the valve (22) via a fluid line (30), and a control device (26). In the control device (26) vehicle information (32) is stored and the control device (26) is configured to control the valve (22) in an accident situation of the automotive vehicle (10) on the basis of the vehicle information (32) and to fill the airbag (24) with the gas stored in the gas tank (20). The invention further shows a method of controlling a safety system of an automotive vehicle and a control device.

19 Claims, 2 Drawing Sheets

(58) Field of Classification Search
CPC ............ B60R 2021/2725; B60R 21/01; B60R 21/015; B60R 21/231; B60R 21/23138; B60R 2021/01204; B60R 2021/01211; B60R 2021/01245; B60R 2021/23146; B64D 11/0621; B60G 2800/925; B65H 2406/413; B60N 2/0021; B60N 2/0035; B60N 2/68
USPC ...................................... 280/728.1, 736, 737
See application file for complete search history.

(56) References Cited

U.S. PATENT DOCUMENTS

| | | |
|---|---|---|
| 2015/0054269 A1 | 2/2015 | Kolatschek et al. |
| 2022/0203922 A1* | 6/2022 | Yamazaki ......... B60R 21/01516 |

FOREIGN PATENT DOCUMENTS

| | | | | |
|---|---|---|---|---|
| DE | 10201000724 A1 | | 8/2011 | |
| DE | 102011082058 A1 | | 3/2013 | |
| DE | 102011085162 A1 | | 4/2013 | |
| DE | 102014201515 A1 | | 7/2015 | |
| JP | 2004155288 A | * | 6/2004 | |
| JP | 2020183129 A | * | 11/2020 | ......... B60R 21/0132 |
| WO | 2002/014118 A1 | | 2/2002 | |
| WO | 2013/029844 A2 | | 3/2013 | |
| WO | 2019/134914 A1 | | 7/2019 | |

OTHER PUBLICATIONS

Description Translation for WO 2013/029844 from Espacenet (Year: 2013).*
Description Translation for JP 2020/183129 from PE2E Search (Year: 2020).*
PCT International Search Report for corresponding International Application Serial No. PCT/EP2021/069458, mailed Oct. 25, 2021, pp. 1-5.

* cited by examiner

SAFETY SYSTEM FOR A MOTOR VEHICLE, METHOD FOR CONTROLLING A SAFETY SYSTEM, AND CONTROL UNIT

RELATED APPLICATIONS

This application is a U.S. National Stage Application filed under 35 USC 371, claiming priority to Serial No. PCT/EP2021/069458, filed on 13 Jul. 2021; which claims priority from German Patent Application DE 10 2020 118 712.2, filed 15 Jul. 2020, the entireties of which are hereby incorporated herein by reference.

TECHNICAL FIELD

The invention relates to a safety system for an automotive vehicle and to a method of controlling a safety system. In addition, the invention relates to a control device.

BACKGROUND

Safety systems are used in automotive vehicles to support a vehicle occupant during an accident of the vehicle, i.e., in an accident situation of the vehicle.

Usually, the safety systems include a plurality of airbags, each airbag being filled via a separate inflator, such as a hybrid or pyrotechnical inflator, in the case of need.

The airbags and inflators are adapted to the respective type of vehicle, and in different types of vehicles different airbags as well as different inflators are used. Thus, a plurality of different inflators is required.

SUMMARY

Therefore, it is the object of the invention to simplify the structure of the safety system.

The object is achieved by a safety system for an automotive vehicle, the safety system comprising a gas tank in which pressurized gas is stored, a valve associated with the gas tank, at least one airbag and a control device. The airbag is connected to the valve via a fluid line, and gas can be led out of the gas tank via the valve. The control device is electronically connected to the valve and is configured to control the valve. In the control device vehicle information is stored, and the control device is configured to control the valve in an accident situation of the vehicle based on the vehicle information and to fill the airbag with the gas stored in the gas tank.

The object of the invention is further achieved by a method of controlling a safety system of an automotive vehicle. The safety system comprises at least one gas tank, a valve, at least one airbag and a control device, the control device being connected to the valve and vehicle information being stored in the control device. The method comprises the following steps of:
  receiving a trigger signal by the control device,
  determining or reading out an amount of gas with which the airbag is to be filled on the basis
  of the vehicle information by the control device,
  controlling the valve by the control device based on the vehicle information stored in the control device such that the airbag is filled with the amount of gas.

The method according to the invention is specifically configured to control a safety system according to the invention.

The invention is based on the basic idea to make use of one gas tank for a plurality of vehicle types. In so doing, the plurality of different inflators is replaced with a central gas tank and a control device. In the control device vehicle information is stored. In the case of need, the control device determines the required amount of gas based on the vehicle information or reads out the required amount of gas based on the vehicle information and appropriately controls the valve so that the airbag is filled with a specific amount of gas. Since individual vehicle information can be stored in the control device, the inflation behavior of the safety system can be adapted to different types of vehicles with very little effort, without having to newly design the safety system as such or to even modify it in terms of hardware for each type. Hence, restraint characteristics can be adapted solely by the control device to different rigidities of the passenger compartment of the vehicle in which the safety system is used. This results in significant cost savings.

An accident situation is understood to be, within the scope of the invention, apart from the actual impact of the vehicle on an obstacle such as another vehicle, also the time interval of up to 500 ms before the actual impact on the obstacle.

The gas tank is a fuel-free cold gas generator. Thus, the gas tank includes no pyrotechnic propellant for generating the filling gas and the number of pyrotechnics used in the vehicle is reduced. The gas tank can be completely free from pyrotechnics. In an alternative embodiment, the gas tank can comprise an igniter, however, that is used to open the gas tank and is configured as a pyrotechnical igniter.

For example, the gas tank is a gas cylinder.

The gas tank may be refillable. The gas tank thus can be reused in particular in the required series-accompanying tests. Thus, the waste produced during the tests is reduced, and the costs for the series-accompanying tests are reduced.

In the gas tank, specifically an inert gas is stored, for example argon, helium, neon, nitrogen or a mixture of the said gases.

The vehicle information stored in the control device generally is information specific to the respective vehicle.

The vehicle information may be a weight and/or a size of the vehicle.

Alternatively, or additionally, the precise vehicle model can be stored as vehicle information in the control device, and the control device then can read the airbags used and connected to the gas tank, in particular the volumes thereof and the amounts of gas required to inflate the airbags, out of a correspondingly stored database.

Alternatively, or additionally, also information about vehicle classes can be stored as vehicle information and, on the basis of the vehicle class of the vehicle, the control device determines the airbags used and connected to the gas tank, in particular the volumes thereof and the amounts of gas required to inflate the airbags.

Possible vehicle classes are: light four-wheeled vehicle, microcar, subcompact car, compact class, medium class, upper middle-sized class, upper class, sports car, van, minivan, compact van, saloon van, sport-utility vehicle, pickup, light-duty vehicle, heavy-duty vehicle.

In general, it is also conceivable that only the amount of gas required to fill the airbags connected to the gas tank is stored in the control device.

One aspect of the invention provides the control device, the airbag and/or the gas tank to be disposed in a vehicle seat, i.e., in a seat of the automotive vehicle. This seat-integrated design facilitates installation of the safety system in the vehicle.

In this case, only the vehicle seat used may be stored as vehicle information in the control device.

The safety system may have an environment sensor and/or a crash sensor which are connected to the control device and are configured to detect an accident to be expected. In this way, the at least one airbag can be appropriately filled or partially filled pre-crash already.

Accordingly, it is possible specifically by means of the environment sensors to detect an expected accident in the time interval from 50 to 500 ms before the actual impact on the obstacle.

The safety system can also include plural environment and/or crash sensors.

In particular, the expected accident is determined based on the combined analysis of the different accident and/or crash sensors. In this way, more accurate information about the expected accident can be obtained.

The control device is connected, for example, via a central control device of the vehicle to the environment and/or crash sensors.

The control device can be connected both wirelessly, such as via a WLAN or Bluetooth interface, and wired, such as via a bus system of the vehicle, to the environment and/or crash sensor.

In one configuration of the invention, the safety system includes plural airbags which are fluid-connected to the valve of the gas tank via appropriate fluid lines. As a result, the number of gas tanks required in a vehicle is reduced.

In order to realize different pressure values in the gas chambers, a valve system may be disposed in the fluid lines, the valve system including at least one limiting valve associated with at least one of the airbags and configured to limit the pressure value of the gas inside the associated airbag.

The valve system can be controllable and can be connected to the control device, the control device being configured to determine a pressure value for each airbag for the expected accident situation and, based on the determined pressure value, to control the valve and the valve system. In this way, the loads acting on a vehicle occupant during a crash can be specifically dampened in response to the expected accident situation.

According to the invention, the term "controllable" means that the control device can set the valves of the valve system. The term "controllable" specifically means that the control device can set the valves at least into the positions of completely opened, completely closed or partly opened/closed.

In other words, the control device can adapt the pressure values in the respective airbags via the valve system corresponding to the accident situation.

For example, the control device can increase the pressure values in the airbags for dampening a side impact in the case of an expected side impact.

In one configuration of the invention, the control device defines a valve opening curve based on the vehicle information. Thus, the deployment of the airbag can be assisted.

Accordingly, the valve opening curve describes the degree of opening of the valve as a function of time.

The valve opening curve is stored as vehicle information in the control device, for example.

A pressure sensor connected to the control device may be associated with the gas tank. Using the pressure sensor, the control device can determine a pressure value of the gas inside the gas tank. In addition, a temperature sensor connected to the control device can be associated with the gas tank. Using the temperature sensor, the control device can determine a temperature value of the gas inside the gas tank. The control device can determine the amount of gas stored in the gas tank via the pressure value and/or the temperature value. In this manner, the amount of gas stored in the gas tank can be determined at any time.

Moreover, the control device can use the temperature value to control the valve and the valve system so as to allow for compensating temperature-dependent performance fluctuations by said control of the valve and the valve system.

In one configuration of the invention, the control device monitors the pressure value inside the gas tank by means of the pressure sensor and/or the temperature sensor.

In other words, the safety system checks the pressure value of the gas and/or the amount of gas stored in the gas tank over a predetermined period of time, in particular in the period of time in which the vehicle is used. In this way, the safety system can be checked even in the installed state of the safety system of the vehicle, and performance of the safety system (viz. a predetermined pressure and/or a predetermined stored amount of gas inside the gas tank) can be safeguarded.

For example, the control device outputs a warning, if the pressure value of the gas tank and/or the amount of gas stored in the gas tank is/are below a predetermined value.

The object of the invention is further achieved by a control device for a safety system of a vehicle, the control device being configured to carry out a method as described above. Regarding the advantages and features, the above explanations concerning the above-described method are referred to which are equally applicable to the control device, and vice versa.

BRIEF DESCRIPTION OF THE DRAWINGS

Further features and advantages of the invention will result from the following description and from the attached drawings which are referred to in the following, and wherein.

DESCRIPTION

Figure 1:
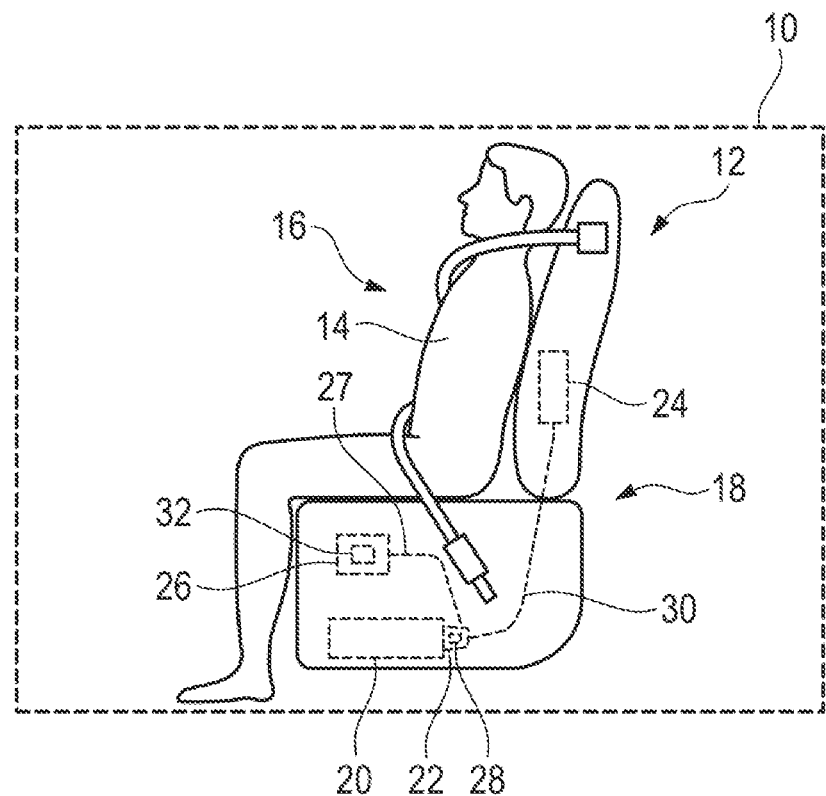
FIG. 1 shows a schematic side view of a safety system according to the invention comprising a control device according to the invention in a first embodiment.
Figure 4:
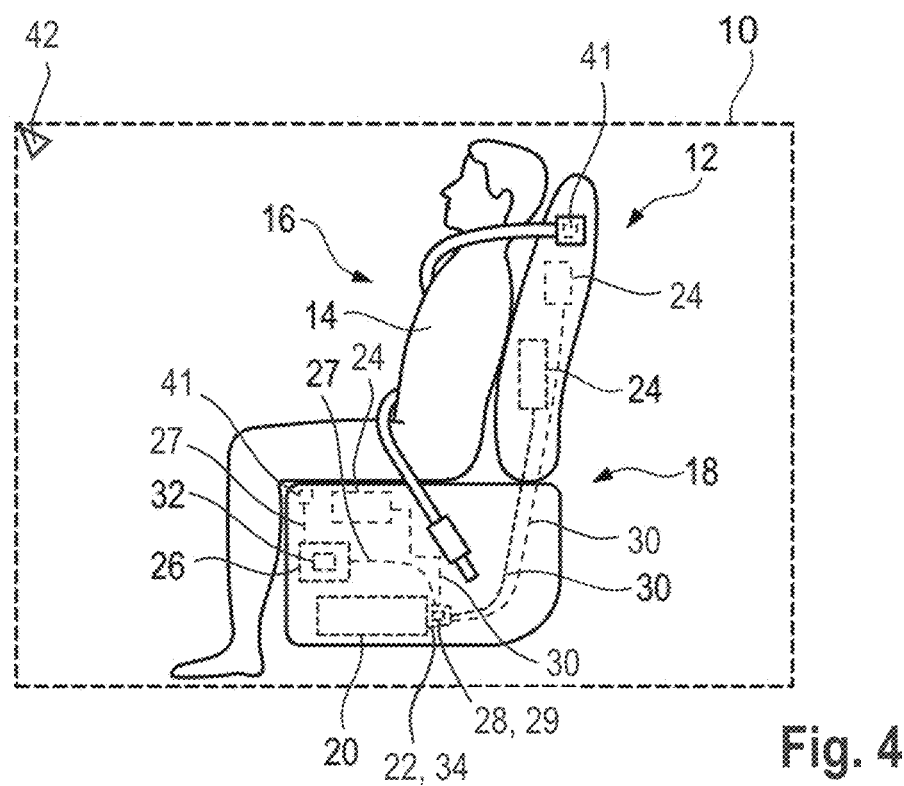
FIG. 4 shows a schematic side view of a safety system according to the invention comprising a control device according to the invention in a third embodiment.

FIGS. 1 and 4 illustrate an automotive vehicle 10 having a vehicle seat 12. A vehicle occupant 14 who is tied to the vehicle seat 12 via a seat belt 16 is seated in the vehicle seat 12.

Apart from the seat belt 16, the vehicle seat 12 includes a safety system 18.

The safety system 18 of FIG. 1 includes a gas tank 20 on which a valve 22 is disposed, an airbag 24 and a control device 26. The safety system 18 of FIG. 4 differs from the safety system of FIG. 1 mainly by the fact that it comprises plural airbags 24. In addition, a valve 22 of a valve system 34 is associated with each airbag.

The control device 26 is connected to the valve 22 via an electric line 27. The electric line can be designed to be both wired and wireless.

In the embodiments of FIGS. 1 and 4, the gas tank 20, the valve 22, the airbag 24 and the control device 26 are integrated in the vehicle seat 12. Accordingly, the safety system 18 is seat-integrated and is not visible in the side view of FIG. 1 and, resp., of FIG. 4. Therefore, the components of the safety system 18 are shown in broken lines.

Pressurized gas, for example an inert gas such as argon, helium, neon or nitrogen, is stored in the gas tank 20. Generally, in the gas tank 20 also a gas mixture may be stored, such as a gas mixture of helium and neon.

The valve 22 in the embodiment of FIG. 1 is a stop valve which is disposed directly on the gas tank 20.

Hence, the valve 22 is mounted in and locks an opening of the gas tank.

In general, the valve 22 is associated only with the gas tank 20, i.e., a gas flow can be realized from the gas tank 20 to the at least one airbag 24 via the valve 22.

For example, the valve 22 could be arranged spaced apart from the gas tank 20 and could be fluid-connected to the gas tank 20 via an appropriate fluid line.

In a closed state of the valve 22, the valve 22 blocks a flow of the gas out of the gas tank 20, and in the opened state the gas flows out of the gas tank 20.

In the valve 22, a pressure sensor 28 and a temperature sensor 29 are disposed via which the pressure value and/or the temperature value of the gas inside the gas tank 20 is/are determined. For this purpose, the pressure sensor 28 and/or the temperature sensor 29 is/are connected to the control device 26 via the electric line 27.

The pressure sensor 28 is a digital manometer, for example. The temperature sensor 29 is a temperature detector or a thermocouple.

The valve 22 and the airbag 24 are, as is shown in FIG. 1, fluid-connected via a fluid line 30 such as a high-pressure or low-pressure hose. In the safety system of FIG. 4, each of the airbags 24 is connected to a valve 22 of the valve system 34 via a separate fluid line 30. This allows each airbag 24 to be separately controlled.

In an opened state of the valve 22, the gas stored in the gas tank 20 can thus flow into the airbag 24 via the fluid line 30.

Before the gas flows into the airbag 24, the airbag 24 is folded and integrated in the vehicle seat 12. For example, the airbag 24 is a side impact protection integrated in the vehicle seat 12 for the protection of the vehicle occupant 14.

The valve 22 is infinitely variable between the closed position of the valve 22 and the opened position of the valve 22 by means of the control device 26.

More precisely, in the control device 26 vehicle information 32 is stored, for example in a read-only memory of the control device 26, and the control device 26 is configured to control the valve 22 in an accident situation of the vehicle 10 based on the stored vehicle information 32 and, thus, to fill the airbag 24 with the gas stored in the gas tank 20. In addition, the control device 26 can access, e.g., additionally or alternatively, vehicle occupant-related sensor values which may be established via seat sensors 41 or interior sensors 42 so as to control, in an accident situation of the vehicle 10, the valve/valves 22 and, thus, to fill the airbag/airbags 24 with the gas stored in the gas tank 20. Via those seat sensors 41 which may be integrated or disposed in the vehicle seat 12 and/or the seat belt 16, for example, or via interior sensors 42 such as camera or radar systems, the body height, the weight or the position of the vehicle occupant 14 in the vehicle seat 12, for example, can be established.

Figure 2:
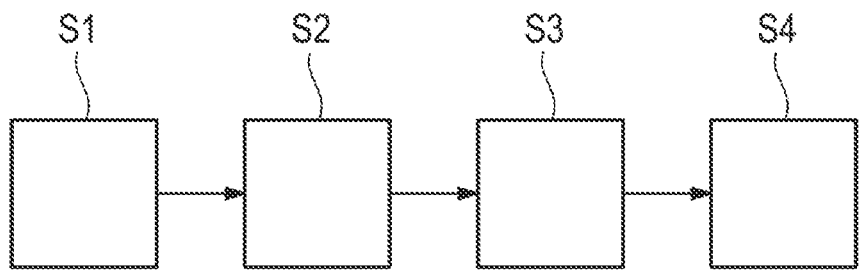
FIG. 2 shows a block diagram of a method according to the invention.

For this purpose, the control device 26 makes use of a method shown in the block diagram of FIG. 2.

In a first method step S1, the control device 26 determines the pressure value and/or the temperature value of the gas inside the gas tank 20 via the pressure sensor 28 and/or the temperature sensor 29. In this manner, the control device 26 can determine the amount of gas stored in the gas tank 20.

For example, the control device 26 determines the amount of gas immediately after starting the vehicle 10 and monitors the pressure value and/or the temperature value during operation of the vehicle 10.

In a next method step S2, the control device 26 receives a trigger signal for triggering the safety system 18.

For example, the control device 26 receives the trigger signal from a central controller of the vehicle 10.

Subsequently (step S3), based on the stored vehicle information 32, the control device 26 determines an amount of gas with which the airbag 24 is to be filled.

As an alternative, the control device 26 can read the amount of gas out of a database stored in the control device 26 also on the basis of the vehicle information 32.

As an alternative, the control device 26 can additionally determine, apart from the amount of gas, based on the stored vehicle information 32 and/or the vehicle occupant-related sensor values and/or sensor values from a crash sensor 38 and/or an environment sensor 40 (see FIG. 3), whether all airbags 24 or only individual airbags 24 are to be filled.

In a next method step S4, the control device 26 controls the valve 22 or, resp., valves 22 of the valve system 34 so that the airbag 24 or, resp., airbags 24 is/are filled with the amount of gas determined or read out in the previous step S3.

In doing so, in the control device 26 a valve opening curve may be stored, for example as vehicle information 32.

Thus, a specific deployment of the airbag 24 or, resp., the airbags 24 is ensured.

In the safety system 18, the valve 22 can be opened and also closed again by means of the control device 26. Accordingly, the amount of gas for the corresponding airbag 24 is determined based on the vehicle information 32 and/or the vehicle occupant-related sensor values and/or the sensor values of the crash sensor 38 and/or the environment sensor 40.

Hence, an airbag 24 of any design can be filled with the gas stored in the gas tank 20 so that it is no longer necessary to design a respective inflator for each airbag 24 of a vehicle 10. The safety system 18 thus can be easily adapted to the respective vehicle 10 via the program code means stored in the control device 26. In this way, the number of different inflators required is reduced. Moreover, no pyrotechnics is necessary to fill the airbag 24.

On the basis of FIG. 3, a safety system according to a second embodiment shall be described which substantially corresponds to the first embodiment so that, in the following, merely the differences will be discussed. Identical and functionally identical components are provided with the same reference numerals.

Figure 3:
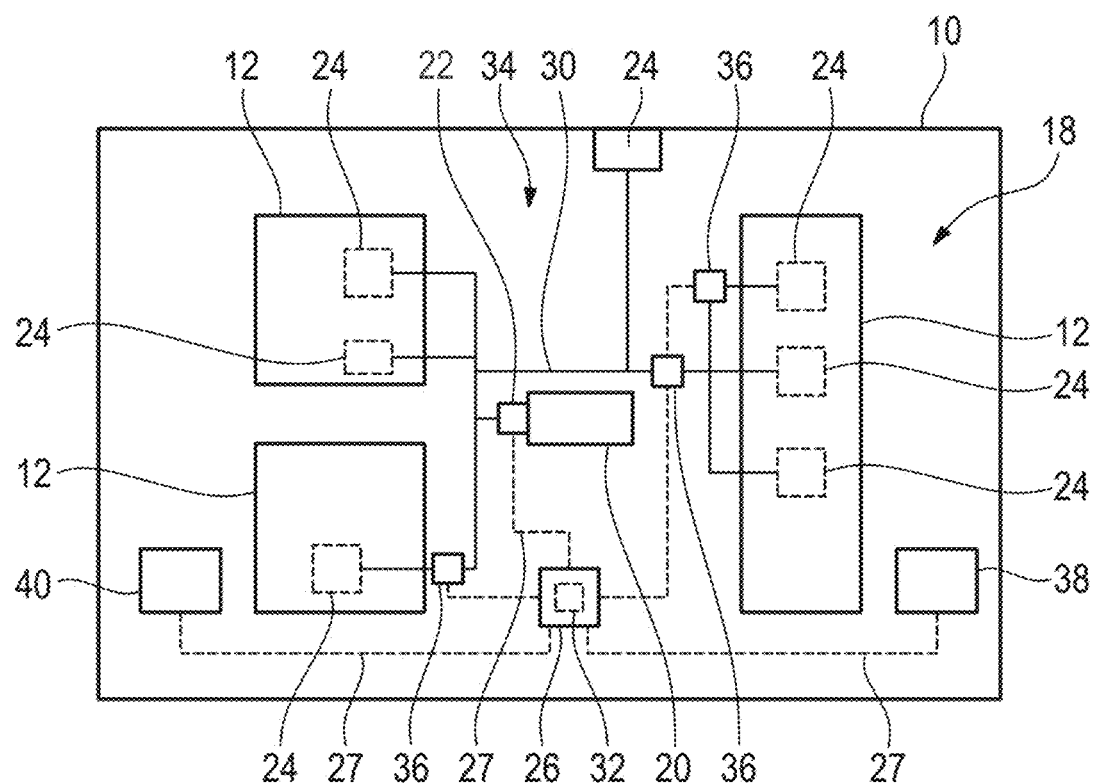
FIG. 3 shows a schematic top view onto an automotive vehicle comprising a safety system according to the invention in a second embodiment.

In order to be able to differentiate between the fluid line 30 and the electric line 27, the fluid line in FIG. 3 is represented by solid lines and the electric line 27 is represented by broken lines.

In the embodiment of FIG. 2, the vehicle 10 has plural vehicle seats 12. The vehicle seats 12 on the left side of FIG. 3 are the vehicle seats 12 of a driver and a front-seat passenger of the vehicle 10, and the vehicle seat 12 on the right side of FIG. 3 is a rear bench seat of the vehicle 10.

Unlike the embodiment of FIG. 1, the gas tank 20, the valve 22 and the control device 26 are not disposed inside a vehicle seat 12 but outside thereof.

Moreover, the safety system 18 of FIG. 3 comprises plural airbags 24. Each vehicle seat 12 includes at least one airbag 24 integrated in the vehicle seat 12.

In addition, an airbag 24 is disposed on a side of the vehicle 10. For example, the airbag 24 in the filled state extends over the entire longitudinal side of the passenger compartment.

Each airbag 24 is connected to the valve 22 via an appropriate fluid line 30. Accordingly, it is not necessary for each airbag 24 to have a completely independent fluid line 30 from the valve 22 to the corresponding airbag 24. The fluid lines 30 of the individual airbags 24 may also be partly overlapping.

A valve system 34 is disposed in the fluid lines 30. The valve system 34 has plural limiting valves 36 for limiting the pressure value of the gas in the respectively associated airbag 24.

Accordingly, each limiting valve 36 is electrically connected to the control device 26 and the control device 26 is configured to control the limiting valves 36.

Correspondingly, the pressure values in the respective airbags 24 can be set by the control device 26.

Unlike the embodiment of FIG. 1, the safety system 18 includes a crash sensor 38 and an environment sensor 40 each of which is electrically connected to the control device 26.

Via the crash sensor 38, an impact of the vehicle 10 on an obstacle or an impact of the obstacle on the vehicle can be detected. For example, the control device 26 receives the trigger signal from the crash sensor 38.

The vehicle environment of the vehicle 10 is monitored by means of the environment sensor 40. For example, the environment sensor 40 is a camera, a radar sensor, an ultrasonic sensor, a LIDAR sensor and/or an infrared sensor.

In particular, an expected accident can be detected by means of the environment sensor 40 and, correspondingly, a trigger signal can be transmitted to the control device 26 before the occurring crash.

In this way, the airbags 24 can be filled already before the occurring accident.

The airbags are filled already in a time interval from 0 to 200 ms, specifically from 20 to 100 ms before the accident, for example.

With the aid of the crash sensor 38 and/or the environment sensor 40, also the type of the (expected) accident situation can be determined, i.e., whether a frontal collision or a side collision is present or imminent, for example.

In general, it is conceivable that the safety system 18 fills the airbags with an appropriate amount of gas in response to the type of accident, that is, appropriately controls the limiting valves 36.

The control device 26 controls the limiting valves 36, for example, such that the airbags 24 between the vehicle occupant 14 and the obstacle are filled with higher pressure.

The invention claimed is:

1. A safety system for an automotive vehicle, comprising
a gas tank in which pressurized gas, specifically inert gas, is stored,
a valve associated with the gas tank, wherein the gas is led out of the gas tank via the valve,
at least one airbag which is connected to the valve via a fluid line, and
a control device which is electronically connected to the valve and is configured to control the valve,
wherein vehicle information is stored in the control device and the control device is configured to control the valve in an accident situation of the vehicle based on the vehicle information and to fill the at least one airbag with the gas stored in the gas tank to fill the at least one airbag with a specific amount of gas configured to pressurize the airbag to a pressure based at least partially on the vehicle information,
wherein the vehicle information comprises information related to the vehicle type so that the valve releases the specific amount of gas from the gas tank according to the specific vehicle type.

2. The safety system according to claim 1, wherein the control device, the at least one airbag and/or the gas tank is/are disposed in a vehicle seat.

3. The safety system according to claim 1, wherein the safety system includes an environment sensor and/or a crash sensor which are connected to the control device and are configured to detect an expected accident.

4. The safety system according to claim 1, wherein the safety system includes plural airbags which are fluid-connected to the valve of the gas tank via corresponding fluid lines.

5. The safety system according to claim 4, wherein a valve system is disposed in the fluid lines, the valve system including at least one limiting valve which is associated with at least one of the airbags and is configured to limit the pressure value of the gas inside the associated airbag.

6. The safety system according to claim 5, wherein the valve system is controllable and is connected to the control device, the control device being configured to determine a pressure value for each airbag for the expected accident situation and to control the valve and the valve system on the basis of the determined pressure value.

7. The safety system according to claim 1, wherein the safety system is configured to be implemented in vehicle seats of vehicles having different vehicle types without modification other than configuring the vehicle information in the control device according to the specific vehicle type.

8. The safety system according to claim 1, wherein the vehicle information comprises a weight and/or size of the vehicle.

9. The safety system according to claim 1, wherein the vehicle information comprises a vehicle class of the vehicle.

10. The safety system according to claim 9, wherein the vehicle class comprises one of a light four-wheeled vehicle, microcar, subcompact car, compact class, medium class, upper middle-sized class, upper class, sports car, van, minivan, compact van, saloon van, sport-utility vehicle, pickup, light-duty vehicle, and heavy-duty vehicle.

11. A method of controlling a safety system of an automotive vehicle, the safety system comprising a gas tank, a valve, at least one airbag and a control device, wherein the control device is connected to the valve and vehicle information comprising the vehicle type is stored in the control device, wherein the method is carried out by the control device and comprises:
   a) receiving a trigger signal by the control device,
   b) determining or reading out an amount of gas with which the at least one airbag is to be filled by the control device on the basis of the vehicle information,
   c) controlling the valve by the control device on the basis of the vehicle-information stored in the control device including the specific type of vehicle in which the safety system is installed such that the at least one airbag is filled with the amount of gas.

12. The method according to claim 11, wherein the control device defines a valve opening curve based on the vehicle information.

13. A control device for a safety system of an automotive vehicle, wherein the control device is configured to carry out the method according to claim 11.

14. The method according to claim 11, wherein a pressure sensor and/or temperature sensor connected to the control device is/are associated with the gas tank, wherein the control device determines a pressure value via the pressure sensor and/or determines a temperature value of the gas inside the gas tank by means of the temperature sensor.

15. The method according to claim 14, wherein the control device monitors the pressure value inside the gas tank via the pressure sensor and/or monitors the temperature value inside the gas tank by means of the temperature sensor.

16. The method according to claim 14, wherein the control device monitors a gas amount of the gas inside the gas tank via the pressure value and/or the temperature value.

17. The method according to claim 11, wherein the vehicle information comprises a weight and/or size of the vehicle.

18. The method according to claim 11, wherein the vehicle information comprises a vehicle class of the vehicle.

19. The method according to claim 18, wherein the vehicle class comprises one of a light four-wheeled vehicle, microcar, subcompact car, compact class, medium class, upper middle-sized class, upper class, sports car, van, minivan, compact van, saloon van, sport-utility vehicle, pickup, light-duty vehicle, and heavy-duty vehicle.

\* \* \* \* \*